(12) United States Patent
Kusama et al.

(10) Patent No.: US 11,282,390 B2
(45) Date of Patent: Mar. 22, 2022

(54) SYSTEM, PROGRAM, AND METHOD FOR DETECTING INFORMATION ON A PERSON FROM A VIDEO OF AN ON-VEHICLE CAMERA

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Tokyo (JP); Yuriko Yamaguchi, Tokyo (JP); Daisuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/577,441

(22) Filed: Sep. 20, 2019

(65) Prior Publication Data
US 2020/0160715 A1    May 21, 2020

(30) Foreign Application Priority Data

Nov. 19, 2018   (JP) .............................. JP2018-216675

(51) Int. Cl.
*G08G 1/16*    (2006.01)
*G06K 9/00*    (2006.01)
*G08G 1/01*    (2006.01)

(52) U.S. Cl.
CPC ......... *G08G 1/166* (2013.01); *G06K 9/00791* (2013.01); *G08G 1/0141* (2013.01)

(58) Field of Classification Search
CPC .... G08G 1/166; G08G 1/0141; G08G 1/0112; G06K 9/00791; G06K 9/00369;
(Continued)

(56) References Cited

U.S. PATENT DOCUMENTS

| | | | | |
|---|---|---|---|---|
| 2008/0239078 A1* | 10/2008 | Mohr | ................. | G06K 9/00805 348/148 |
| 2011/0231419 A1* | 9/2011 | Papke | ................... | G06F 16/784 707/756 |

(Continued)

FOREIGN PATENT DOCUMENTS

JP    2007-172495 A    7/2007

*Primary Examiner* — John A Tweel, Jr.
(74) *Attorney, Agent, or Firm* — Sughrue Mion, PLLC

(57) ABSTRACT

An information processing system includes vehicles and a server. Each of the vehicles generates a video obtained by imaging outside scenery in association with a time and transmit the video and position information of a host vehicle at a time when the video is generated to the server. The server detects attribute information of a person in the video from the video and detects position information of the person at the time based on the position information of the host vehicle at the time when the video is generated, when the video and the position information are received from the host vehicle. The server specifies the same person appearing in two or more videos of videos respectively received from the vehicles and transmits the attribute information of the specified person and movement path information including time-series data of the position information of the person to a client.

10 Claims, 5 Drawing Sheets

(58) Field of Classification Search
CPC . G06Q 30/02; G06T 7/73; G06T 2207/10016;
G06T 2207/30196; G06T 2207/30241;
G06T 2207/30252
USPC ............. 340/426.23, 435, 436, 463; 382/104
See application file for complete search history.

(56) References Cited

U.S. PATENT DOCUMENTS

2013/0129149 A1* 5/2013 Nandakumar ..... G06Q 30/0276
382/104
2019/0259284 A1* 8/2019 Khadloya ................. G06T 7/97

* cited by examiner

| PERSON ID | ATTRIBUTE INFORMATION | MOVEMENT PATH INFORMATION ||
|---|---|---|---|
| | | TIME POINT | POSITION |
| ** | ** | t1 | P(t1) |
| | | t2 | P(t2) |
| | | ... | ... |

SYSTEM, PROGRAM, AND METHOD FOR DETECTING INFORMATION ON A PERSON FROM A VIDEO OF AN ON-VEHICLE CAMERA

INCORPORATION BY REFERENCE

The disclosure of Japanese Patent Application No. 2018-216675 filed on Nov. 19, 2018 including the specification, drawings and abstract is incorporated herein by reference in its entirety.

BACKGROUND

1. Technical Field

The disclosure relates to an information processing system, a program, and an information processing method.

2. Description of Related Art

In the related art, a technique of detecting information on a subject from a video of an on-vehicle camera is known. For example, Japanese Unexamined Patent Application Publication No. 2007-172495 (JP 2007-172495 A) discloses a technique that analyzes an image near a vehicle acquired from a camera unit mounted on the vehicle to recognize road attributes of a road.

SUMMARY

A movable subject such as a person may appear in the video of the on-vehicle camera in addition to a non-moving subject such as a road. Here, detection and analysis of movement paths of people (for example, time-series data of position information of a person) are useful in various fields, for example, marketing such as an opening plan of a store and an operation plan of a mobile store. However, in the related art, it is impossible to detect a movement path of a person who is the subject. As described above, the convenience of the technique of detecting the information on the person from the video of the on-vehicle camera is not always high.

The disclosure improves the convenience of a technique of detecting information on a person from a video of an on-vehicle camera.

An aspect of the disclosure relates to an information processing system. The information processing system includes a plurality of vehicles; and a server configured to communicate with the vehicles. Each of the vehicles generates a video obtained by imaging outside scenery in association with a time point and transmits the video and position information of a host vehicle at a time point when the video is generated to the server. The server detects attribute information of a person appearing in the video from the video when the video and the position information are received from the host vehicle, detects position information of the person at the time point based on the position information of the host vehicle at the time point when the video is generated, specifies the same person appearing in two or more videos of a plurality of the videos respectively received from the vehicles, and transmits the attribute information of the specified person and movement path information including time-series data of the position information of the person to a client.

An aspect of the disclosure relates to a program. The program causes an information processing device configured to communicate with each of a plurality of vehicles that generates a video obtained by imaging outside scenery in association with a time point to execute a step of detecting attribute information of a person appearing in the video from the video when the video and position information of a vehicle among the vehicles at a time point when the video is generated are received from the vehicle; a step of detecting position information of the person at the time point based on the position information of the vehicle at the time point when the video is generated; a step of specifying the same person appearing in two or more videos of a plurality of the videos respectively received from the vehicles; and a step of transmitting the attribute information of the specified person and movement path information including time-series data of the position information of the person to a client.

An aspect of the disclosure relates to an information processing method. The information processing method is executed by an information processing system including a plurality of vehicles and a server configured to communicate with the vehicles. The method includes generating a video obtained by imaging outside scenery in association with a time point and transmitting the video and position information of a host vehicle at a time point when the video is generated to the server by each of the vehicles, and detecting attribute information of a person appearing in the video from the video when the video and the position information are received from the host vehicle, detecting position information of the person at the time point based on the position information of the host vehicle at the time point when the video is generated, specifying the same person appearing in two or more videos of a plurality of the videos respectively received from the vehicles, and transmitting the attribute information of the specified person and movement path information including time-series data of the position information of the person to a client by the server.

With the information processing system, the program, and the information processing method according to the aspects of the disclosure, the convenience of the technique of detecting the information on the person from the video of the on-vehicle camera is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart showing an operation of the vehicle;

DETAILED DESCRIPTION OF EMBODIMENTS

Hereinafter, the embodiment of the disclosure will be described.

Configuration of Information Processing System

Figure 1:
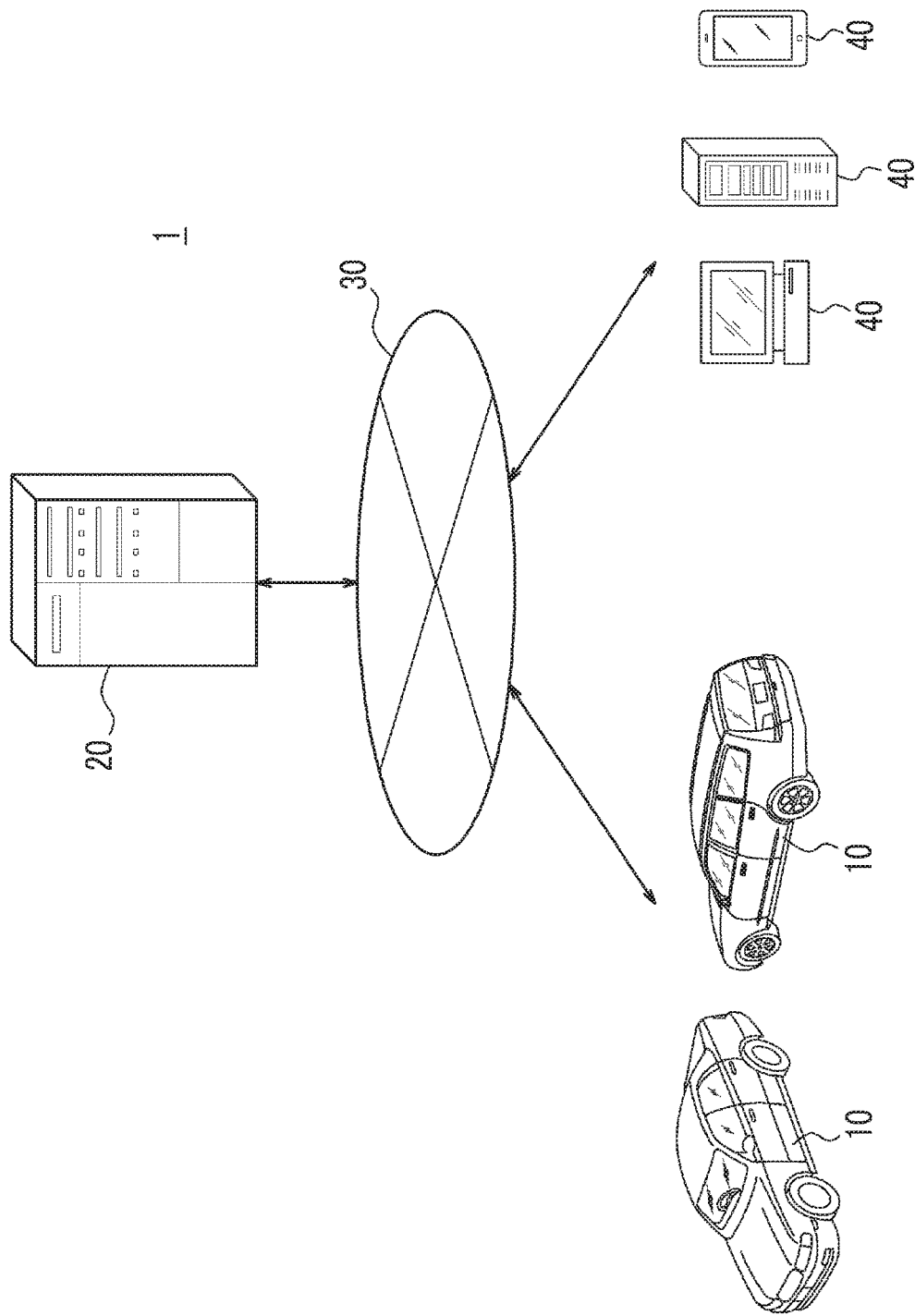
FIG. 1 is a diagram showing a schematic configuration of an information processing system according to an embodiment of the disclosure.

An outline of an information processing system 1 according to the embodiment of the disclosure will be described with reference to FIG. 1. The information processing system 1 includes a plurality of vehicles 10 and a server 20. The vehicle 10 is, for example, an automobile, but is not limited thereto, and may be any vehicle. Solely two vehicles 10 are exemplified in FIG. 1 for convenience of the description, but the information processing system 1 may include the predetermined number of vehicles 10. The server 20 includes one or a plurality of information processing devices (for example, server devices) configured to communicate with each other. The vehicle 10 and the server 20 can communicate with each other through a network 30 including, for example, a mobile communication network and the Internet. In addition, the server 20 can communicate with a client 40 through the network 30. The client 40 is, for example, a personal computer (PC), a server device, or a smartphone, but may be a predetermined information processing device.

The outline of the embodiment will be first described, and details thereof will be described below. The vehicle 10 includes, for example, an on-vehicle camera and generates a video obtained by imaging outside scenery. In the embodiment, the "video" may include a still image and a moving image. A person, for example, a pedestrian around the vehicle 10 may appear in the video. The server 20 detects attribute information (for example, age or the like) of the person appearing in the video of the vehicle 10 and position information P(t). In addition, the server 20 specifies the same person appearing in two or more videos of a plurality of videos respectively received from the vehicles 10. The server 20 transmits the attribute information of the specified person and movement path information including, for example, time-series data (that is, the movement path of the person) of the position information P(t) of the person to the client 40.

Figure 2:
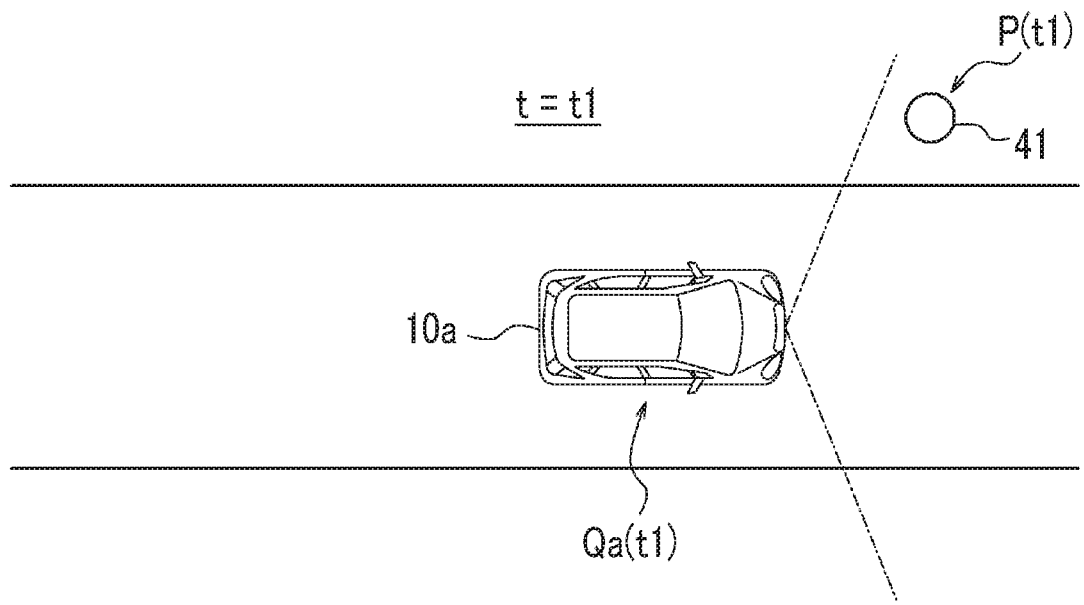
FIG. 2 is a diagram showing a position relationship between a vehicle and a subject at time point t=t1.
Figure 3:
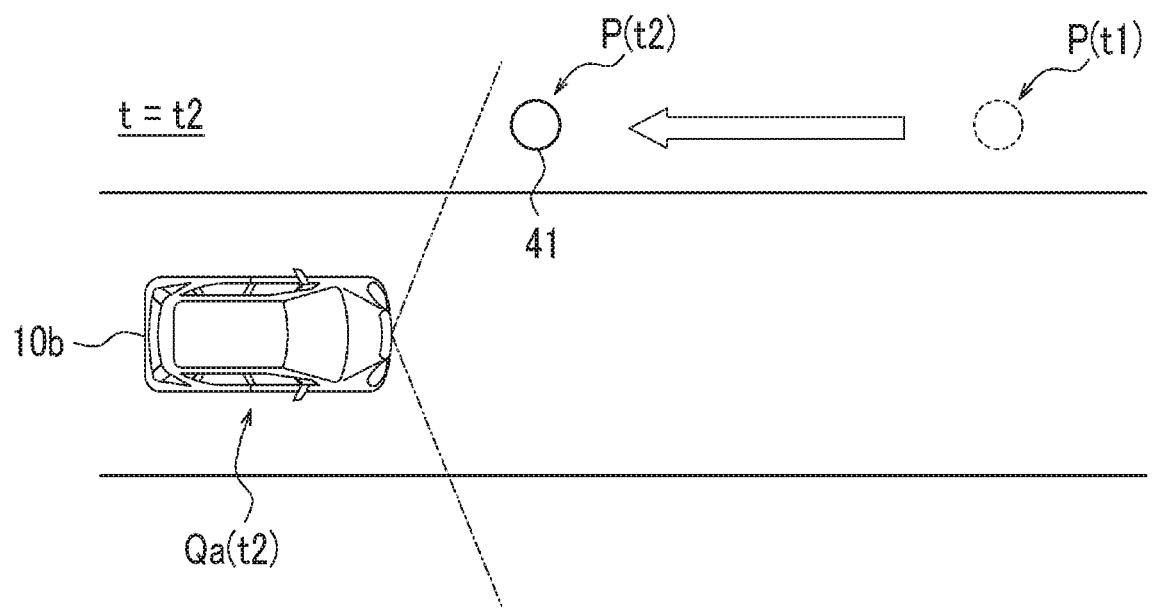
FIG. 3 is a diagram showing a position relationship between the vehicle and the subject at time point t=t2.

Here, a generation method of the time-series data of the position information P(t) of a person 41 will be described in detail with reference to FIGS. 2 and 3. FIG. 2 shows a position relationship between a first vehicle 10a and the person 41 at time point t=t1. There is the person 41 in the field of view of the on-vehicle camera indicated by the one-dot line in FIG. 2. Therefore, the person 41 present at P(t1) appears in a video generated by the first vehicle 10a at time point t=t1. As described below, the server 20 detects position information P(t1) of the person 41 based on position information Qa (t1) of the first vehicle 10a at time point t=t1 or the like. On the other hand, FIG. 3 shows a position relationship between a second vehicle 10b and the person 41 at time point t=t2 (however, t1<t2). The second vehicle 10b is, for example, a following vehicle of the first vehicle 10a. As shown in FIG. 3, the person 41 moves from P(t1) to P(t2) during the time elapses from t1 to t2. There is the person 41 in the field of view of the on-vehicle camera indicated by the one-dot line in FIG. 3. Therefore, the person 41 present at P(t2) appears in a video generated by the second vehicle 10b at time point t=t2. The server 20 detects position information P(t2) of the person 41 based on position information Qb (t2) of the second vehicle 10b at time point t=t2 or the like. Therefore, when the same person appears in two or more videos of the videos respectively generated by the vehicles 10, it is possible to generate the pieces of time-series data P(t1), P(t2), and . . . of the position information P(t) of the person.

As described above, according to the embodiment, it is possible to detect the movement path information of the same person appearing in two or more videos by using the videos respectively generated by the vehicles 10. The attribute information and the movement path information of the person are provided from the information processing system 1 to the client 40. The client 40 can use the pieces of information provided from the information processing system 1 in order to analyze the movement paths of people and use the analyzed result in a field such as marketing. Therefore, the convenience of the technique of detecting the information on the person from the video of the on-vehicle camera is improved.

Next, each configuration of the information processing system 1 will be described in detail.

Configuration of Vehicle

Figure 4:
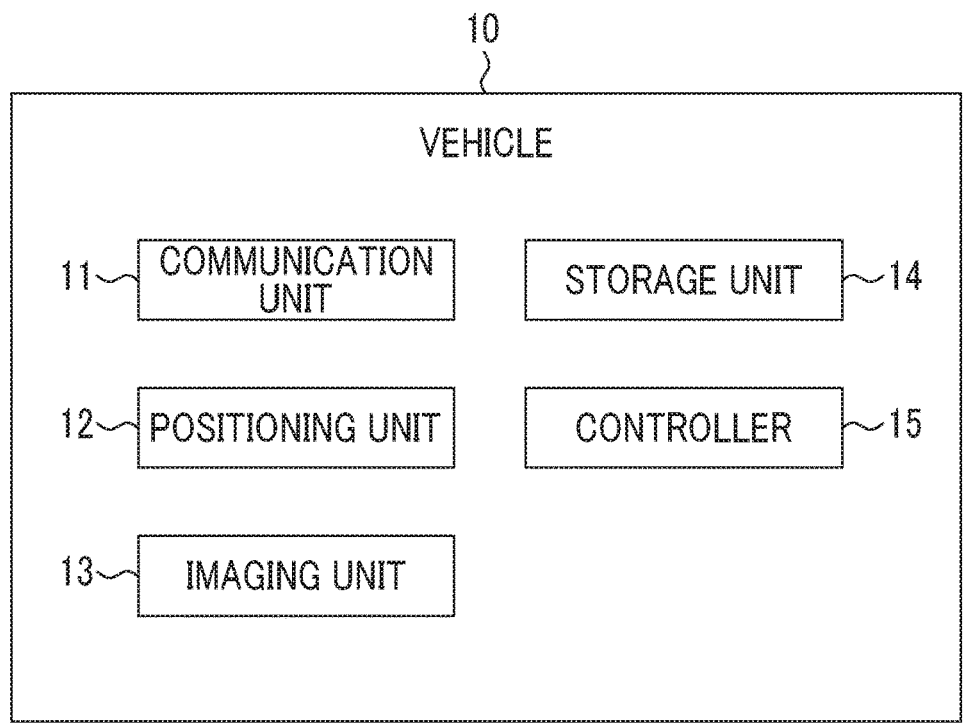
FIG. 4 is a block diagram showing a schematic configuration of the vehicle.

As shown in FIG. 4, the vehicle 10 comprises a communication unit 11, a positioning unit 12, an imaging unit 13, a storage unit 14, and a controller 15. The communication unit 11, the positioning unit 12, the imaging unit 13, the storage unit 14, and the controller 15 may be respectively built in the vehicle 10 or may be respectively provided in the vehicle 10 in a detachable manner. The communication unit 11, the positioning unit 12, the imaging unit 13, the storage unit 14, and the controller 15 are connected to each other in a communicable manner through, for example, an on-vehicle network such as controller area network (CAN) or a dedicated line.

The communication unit 11 includes a communication module connected to the network 30. The communication module is in compatible with mobile communication standards such as 4th Generation (4G) and 5th Generation (5G) to connect to the network 4, but is not limited thereto, and may be in compatible with any communication standard. For example, an on-vehicle communication apparatus such as data communication module (DCM) may function as the communication unit 11. In the embodiment, the vehicle 10 is connected to the network 30 through the communication unit 11.

The positioning unit 12 includes a receiver compatible with a satellite positioning system. The receiver is in compatible with, for example, a global positioning system (GPS), but is not limited thereto, and may be in compatible with any satellite positioning system. For example, a car navigation device may function as the positioning unit 12. In the embodiment, the vehicle 10 acquires the position information of a host vehicle using the positioning unit 12.

The imaging unit 13 includes an on-vehicle camera that generates a video obtained by imaging a subject in the field of view. The on-vehicle camera may be a monocular camera or a stereo camera. The imaging unit 13 is included in the vehicle 10 such that the outside scenery can be imaged. For example, an electronic apparatus having a camera function such as a drive recorder or a smartphone used by an occupant may function as the imaging unit 13. In the embodiment, the vehicle 10 generates the video obtained by imaging the outside scenery in association with the time point using the imaging unit 13.

The storage unit 14 includes one or more memories. In the embodiment, the "memory" is, for example, a semiconductor memory, a magnetic memory, or an optical memory, but is not limited thereto. Each memory included in the storage unit 14 may function as, for example, a main storage device, an auxiliary storage device, or a cache memory. The storage unit 14 stores predetermined information used for the operation of the vehicle 10. For example, the storage unit 14 may store a system program, an application program, embedded software, and the like. The information stored in the storage unit 14 may be updatable with, for example, information to be acquired from the network 30 through the communication unit 11.

The controller 15 includes one or more processors. In the embodiment, the "processor" is a general purpose processor, a dedicated processor specialized for specific processing, or the like, but is not limited thereto. For example, an electronic control unit (ECU) mounted on the vehicle 10 may function as the controller 15. The controller 15 controls the operation of the entire vehicle 10.

For example, the controller 15 generates the video obtained by imaging the outside scenery in association with time point t using the imaging unit 13. Therefore, the generated video includes information on the time point t when the video is generated. The controller 15 transmits the generated video and the position information Q(t) of the host vehicle at time point t when the video is generated to the server 20. Here, the controller 15 may transmit the video and the position information Q(t) every time the video is generated or may store the video and the position information Q(t) in the storage unit 14 for a certain period and then transmit the video and the position information Q(t). In addition, the controller 15 may determine whether a person appears in the generated video by image recognition, transmit the video and the position information Q(t) when determination is made that the person appears, and discard the video without transmitting the video when determination is made that the person does not appear.

Configuration of Server

Figure 5:
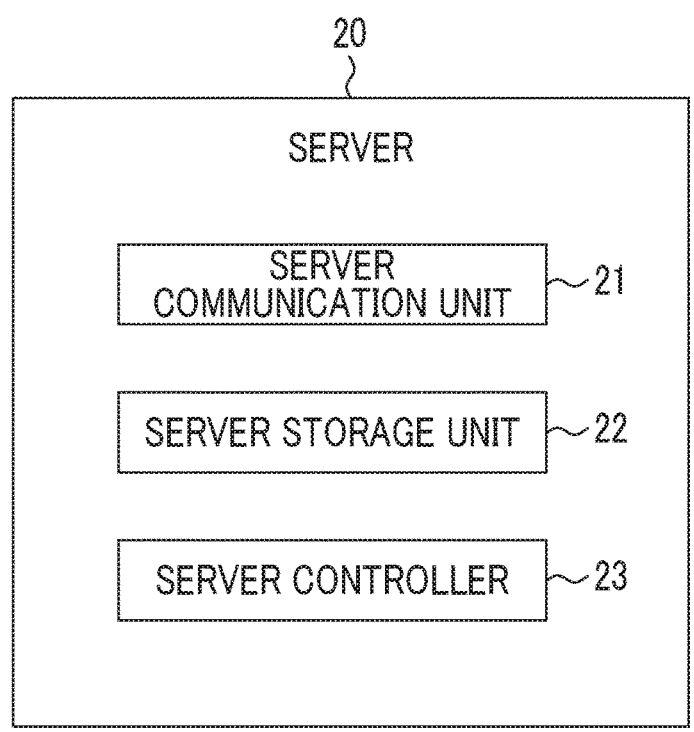
FIG. 5 is a block diagram showing a schematic configuration of a server.

As shown in FIG. 5, the server 20 includes a server communication unit 21, a server storage unit 22, and a server controller 23.

The server communication unit 21 includes a communication module connected to the network 30. The communication module is in compatible with, for example, a wired local area network (LAN) standard, but is not limited thereto, and may be in compatible with any communication standard. In the embodiment, the server 20 is connected to the network 30 through the server communication unit 21.

The server storage unit 22 includes one or more memories. Each memory included in the server storage unit 22 may function as, for example, a main storage device, an auxiliary storage device, or a cache memory. The server storage unit 22 stores predetermined information used for the operation of the server 20. For example, the server storage unit 22 may store a system program, an application program, a database, and the like. The information stored in the server storage unit 22 may be updatable with, for example, information to be acquired from the network 30 through the server communication unit 21.

The server controller 23 includes one or more processors. The server controller 23 controls the operation of the entire server 20.

For example, when the video and the position information Q(t) are received from the vehicle 10, the server controller 23 detects the attribute information of the person appearing in the video from the video by the image recognition. The attribute information includes, for example, at least one of age, age group, gender, and clothing, but is not limited thereto, and may include any attribute detectable from the video by the image recognition. Any image recognition method, such as pattern matching, feature point extraction, or machine learning, can be employed for the detection of the attribute information. The attribute information may not include, for example, personal information that can uniquely identify a person to protect the personal information of the person.

In addition, the server controller 23 detects the position information P(t) of the person at time point t based on the position information Q(t) of the vehicle at time point t when the video is generated. Here, the server controller 23 may detect the position information Q(t) of the vehicle as the position information P(t) of the person by regarding the position information Q(t) of the vehicle and the position information P(t) of the person as substantially the same. In the related case, P(t)=Q(t). Alternatively, the server controller 23 may detect a relative position information D(t) between the vehicle 10 and the person from the video and may detect the position information P(t) of the person based on the position information Q(t) of the vehicle 10 and the detected relative position information D(t). The relative position information D(t) is, for example, relative position information of the person viewed from the vehicle 10. In the related case, P(t)=Q(t)+D(t). The relative position information D(t) is detected based on, for example, a distance between the vehicle 10 and the person, a direction of the person viewed from the vehicle 10, and an orientation of the vehicle 10. The distance between the vehicle 10 and the person can be detected by any ranging method using the video such as a motion stereo method using a monocular camera video or a stereo method using parallax of a stereo camera video. The direction of the person viewed from the vehicle 10 can be detected based on, for example, a position in the video of the person. The orientation of the vehicle 10 can be detected by using, for example, a geomagnetic sensor and a gyro sensor mounted on the vehicle 10.

Figure 6:
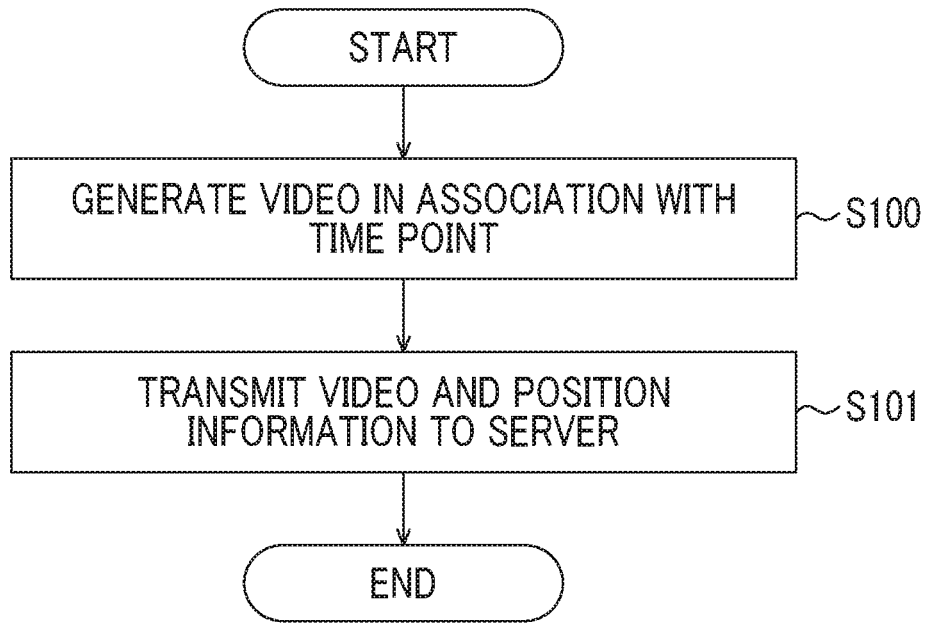
FIG. 6 is a table showing an example of information stored in the server.

In addition, the server controller 23 specifies the same person appearing in two or more videos of the videos respectively received from the vehicles 10. Any image recognition method, such as pattern matching, feature point extraction, or machine learning, can be employed for the specification of the same person. Here, two or more videos are videos obtained by respectively imaging the same person at different time points by two or more vehicles 10. Therefore, when the time points when two or more videos are generated are assumed to be t1, t2, and . . . , the pieces of position information P(t1), P(t2), and . . . of the person have been detected by the above operation of the server controller 23. The server controller 23 generates the movement path information including the pieces of position information P(t1), P(t2), and . . . of the person. The server controller 23 decides a person ID that uniquely identifies the person, associates the person ID, the attribute information, and the movement path information of the person with each other, and stores the associated information in the database of the server storage unit 22, for example, as shown in FIG. 6. The person ID, the attribute information, and the movement path information of one person are shown in the example shown in FIG. 6, but the person ID, the attribute information, and the movement path information of each of a plurality of persons may be stored in the database.

In addition, the server controller 23 extracts the attribute information and the movement path information of the person from the database of the server storage unit 22, for example, in response to a request from the client 40 or automatically and transmits the extracted information to the client 40. When the pieces of information are extracted from the database, the server controller 23 may extract the pieces of information with predetermined attribute information as a query. For example, when attribute information "male 20 to 29 years old" is used as a query, the server controller 23 extracts movement path information of each person who matches "male 20 to 29 years old" from the database and transmits the extracted information to the client 40 together with the attribute information. The query may be designated by, for example, the client 40. With the related configuration, the client 40 can acquire the pieces of movement path information of people who match desired attribute information.

Operation Flow of Vehicle

An operation flow of the vehicle 10 will be described with reference to FIG. 7.

Step S100: The controller 15 generates the video obtained by imaging the outside scenery in association with time point t.

Step S101: The controller 15 transmits the generated video and the position information Q(t) of the host vehicle at time point t when the video is generated to the server 20 through the communication unit 11.

Operation Flow of Server

Figure 8:
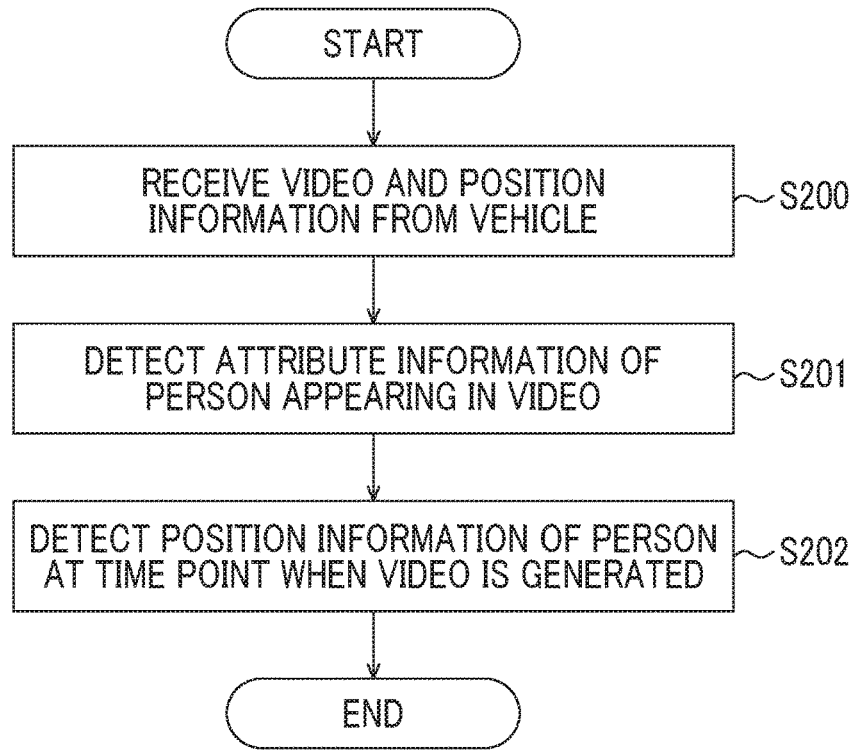
FIG. 8 is a flowchart showing a first operation of the server.

A flow of a first operation of the server 20 will be described with reference to FIG. 8. As an outline, the first operation is an operation that detects the attribute information and the position information of the person appearing in the video received from the vehicle 10.

Step S200: The server controller 23 receives the video and the position information Q(t) from the vehicle 10 through the server communication unit 21.

Step S201: The server controller 23 detects the attribute information of the person appearing in the video from the video by the image recognition.

Step S202: The server controller 23 detects the position information P(t) of the person at time point t based on the position information Q(t) of the vehicle at time point t when the video is generated.

Figure 9:
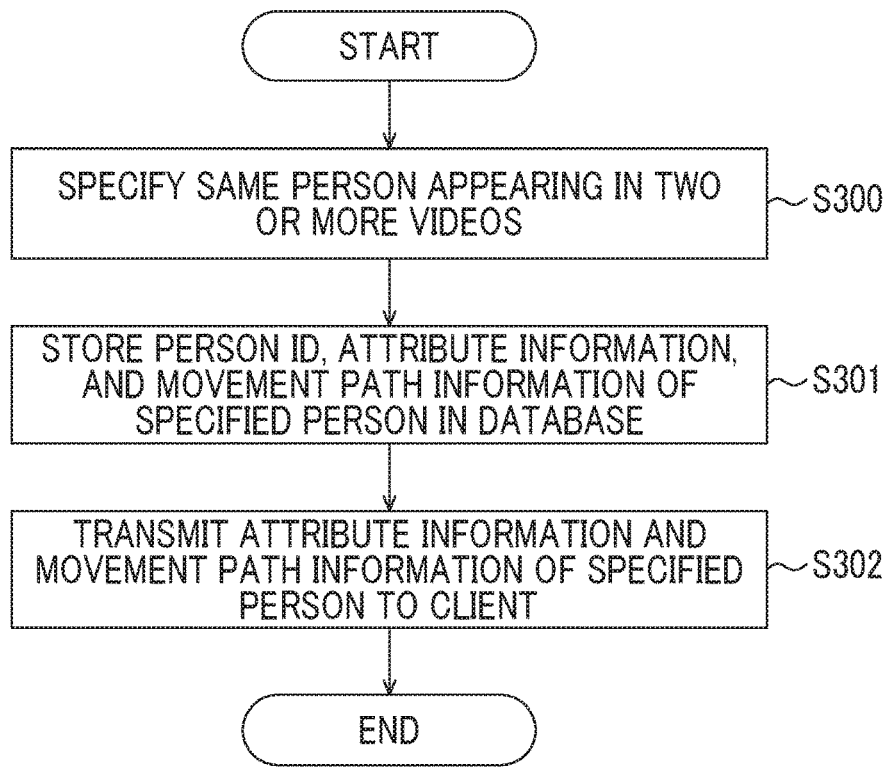
FIG. 9 is a flowchart showing a second operation of the server.

A flow of a second operation of the server 20 will be described with reference to FIG. 9. As an outline, the second operation is an operation that stores the movement path information and the like of the person in the database and transmits the stored information to the client 40.

Step S300: The server controller 23 specifies the same person appearing in two or more videos of the videos respectively received from the vehicles 10.

Step S301: The server controller 23 associates the person ID, the attribute information, and the movement path information including the time-series data of the position information P(t) of the specified person with each other and stores the associated information in the database of the server storage unit 22.

Step S302: The server controller 23 extracts the attribute information and the movement path information of the person from the database of the server storage unit 22, for example, in response to the request from the client 40 or automatically and transmits the extracted information to the client 40.

As described above, with the information processing system 1 according to the embodiment, the vehicles 10 respectively generate the videos obtained by imaging the outside scenery in association with time point t and transmit the video and the position information of the host vehicle at time point t when the video is generated to the server 20. When the video and the position information are received from the vehicle 10, the server 20 detects the attribute information of the person appearing in the video and the position information P(t) of the person at time point t when the video is generated. The server 20 specifies the same person appearing in two or more videos of the videos respectively received from the vehicles 10 and transmits the attribute information of the specified person and the movement path information including the time-series data of the position information P(t) to the client 40.

With the related configuration, it is possible to detect the movement path information of the same person appearing in two or more videos by using the respectively generated by the vehicles 10. The client 40 can use the attribute information and the movement path information of the person received from the information processing system 1 in order to analyze the movement paths of people and use the analyzed result in the field such as marketing. Therefore, the convenience of the technique of detecting the information on the person from the video of the on-vehicle camera is improved.

The embodiments have been described based on the drawings and the examples, but it is to be noted that those skilled in the art easily perform various modifications and changes based on this disclosure. Therefore, it is to be noted that these modifications and changes are included in the scope of the disclosure. For example, the functions and the like included in each unit, each step, or the like can be disposed again so as not to be logically contradictory, and a plurality of units, steps, or the like can be combined into one, or divided.

For example, in the above embodiment, some processing operations executed in the server 20 may be executed in the vehicle 10. For example, the processing of detecting the attribute information and the position information of the person appearing in the video may be executed by the vehicle 10, not by the server 20. In the related case, the vehicle 10 does not transmit the video to the server 20, but transmits the attribute information and the position information of the person detected in the vehicle 10 to the server 20.

In the above embodiment, the configuration in which the movement path information of the person includes the time-series data of the position information P(t) of the person, that is, the movement path is described. However, the movement path information of the person may further include information on at least one of a movement start point and a movement end point in the movement path. The information on the movement start point or the movement end point includes, for example, a name (for example, company name or facility name) of a point where the person starts or ends the movement or an attribute (for example, company, station, or restaurant), but is not limited thereto, and may include any information on the point. Specifically, when the movement path information includes the pieces of position information P(t1), P(t2), . . . , and P(tn) at time points t1 to tn, the server controller 23 may set a point indicated by the position information P(t1) with the earliest time t as the movement start point and may set a point indicated by the position information P(tn) with the latest time t as the movement end point. The server controller 23 extracts the information on the movement start point and the movement end point from, for example, map information and adds the extracted information to the movement path information.

Furthermore, as described above, when the attribute information and the movement path information of the person are extracted from the database of the server storage unit 22, the server controller 23 may execute the extraction of the information with the information on the movement start point or the movement end point included in the movement path information as a query. For example, when information on the movement end point "ABC restaurant" is used as a query, the server controller 23 extracts the movement path information of each person having the movement end point that is "ABC restaurant" from the database and transmits the extracted information to the client 40 together with the attribute information. With the related configuration, for example, the client 40 recognizes destinations of people who move from desired points or departure points of people who move toward desired points, recognizes pieces of attribute information of people who move from the desired points or move to the desired points, or the like, using the movement path information received from the information processing system 1. In this manner, the client 40 can perform a more detailed analysis. Therefore, the convenience of the technique of detecting the information on the person from the video of the on-vehicle camera is improved.

A general purpose information processing devices such as a smartphone, a computer, or the like can be configured to function as each configuration unit of the vehicle 10 or the server 20 according to the embodiment described above. Specifically, a program, in which processing contents for realizing each function of the vehicle 10 or the server 20 according to the embodiment are described, is stored in a memory of the information processing device and causes a processor of the information processing device to read and execute the program. Therefore, the embodiment can also be realized as the program that can be executed by the processor.

What is claimed is:

1. An information processing system comprising:
   a plurality of vehicles; and
   a server configured to communicate with the vehicles, wherein:
   each of the vehicles generates a video obtained by imaging outside scenery in association with a time point and transmits the video and position information of a host vehicle at a time point when the video is generated to the server; and
   wherein the server, when the video and the position information are received from the host vehicle, detects attribute information of a person appearing in the video from the video and detects position information of the person at the time point based on the position information of the host vehicle at the time point when the video is generated, specifies the same person appearing in two or more videos of a plurality of the videos respectively received from the vehicles, and transmits the attribute information of the specified person and movement path information including time-series data of the position information of the person to a client,
   wherein the movement path information further includes information on at least one of a movement start point and a movement end point in the movement path of the specified person, and
   wherein information on the at least one of the movement start point and the movement end point includes a name of the movement start point or the movement end point, or an attribute of the movement start point or the movement end point.

2. The information processing system according to claim 1, wherein the attribute information of the person includes at least one of age, age group, gender, and clothing of the person.

3. The information processing system according to claim 1, wherein the server detects the position information of the host vehicle at the time point when the video is generated as the position information of the person at the time point.

4. The information processing system according to claim 1, wherein the server detects relative position information between the host vehicle and the person appearing in the video from the video when the video is received from the host vehicle and detects the position information of the person at the time point based on the position information of the host vehicle at the time point, when the video is generated and the detected relative position information.

5. A non-transitory computer-readable medium storing instructions that, when executed by at least one processor for an information processing device configured to communicate with each of a plurality of vehicles that generates a video obtained by imaging outside scenery in association with a time point, cause the at least one processor to:
   detect attribute information of a person appearing in the video from the video when the video and position information of a vehicle among the vehicles at a time point when the video is generated are received from the vehicle;
   detect position information of the person at the time point based on the position information of the vehicle at the time point when the video is generated when the video and position information of the vehicle at the time point when the video is generated are received from the vehicle;
   specify the same person appearing in two or more videos of a plurality of the videos respectively received from the vehicles; and
   transmit the attribute information of the specified person and movement path information including time-series data of the position information of the person to a client,
   wherein the movement path information further includes information on at least one of a movement start point and a movement end point in the movement path of the specified person, and
   wherein information on the at least one of the movement start point and the movement end point includes a name of the movement start point or the movement end point, or an attribute of the movement start point or the movement end point.

6. An information processing method executed by an information processing system including a plurality of vehicles and a server configured to communicate with the vehicles, the method comprising:
   generating a video obtained by imaging outside scenery in association with a time point and transmitting the video and position information of a host vehicle at a time point when the video is generated to the server by each of the vehicles;
   detecting attribute information of a person appearing in the video from the video and detecting position information of the person at the time point based on the position information of the host vehicle at the time point when the video is generated when the video and the position information are received from the host vehicle;
   specifying the same person appearing in two or more videos of a plurality of the videos respectively received from the vehicles; and
   transmitting the attribute information of the specified person and movement path information including time-series data of the position information of the person to a client by the server, wherein the movement path information further includes information on at least one of a movement start point and a movement end point in the movement path of the specified person, and wherein information on the at least one of the movement start point and the movement end point includes a name of the movement start point or the movement end point, or an attribute of the movement start point or the movement end point.

7. The information processing system according to claim 1, wherein the server is further configured to:

extract, from a database, the attribute information of the specified person and the movement path information using the name of the movement start point or the movement end point, or the attribute of the movement start point or the movement end point as a query.

8. The non-transitory computer-readable medium according to claim 5, wherein the program is further configured to cause the processor to:

extract, from a database, the attribute information of the specified person and the movement path information using the name of the movement start point or the movement end point, or the attribute of the movement start point or the movement end point as a query.

9. The information processing method according to claim 6, wherein the method further comprises:

extracting, from a database, the attribute information of the specified person and the movement path information using the name of the movement start point or the movement end point, or the attribute of the movement start point or the movement end point as a query.

10. The information processing system according to claim 1, wherein the server is further configured to:

determine whether a person appears in the generated video, and discard the video when determination is made that the person does not appear.

* * * * *